United States Patent Office 3,588,981
Patented June 29, 1971

3,588,981
METHOD FOR MOUNTING PNEUMATIC TIRES ON WHEELS
George David Beharrell, Solihull, and George Edward Adams, Kenilworth, England, assignors to Dunlop Rubber Company Limited, Birmingham, England
Filed Nov. 21, 1966, Ser. No. 595,746
Int. Cl. B21h 1/02; B21k 1/32
U.S. Cl. 29—159.01                                    5 Claims

ABSTRACT OF THE DISCLOSURE

The disclosure relates to vehicle wheels of the tire and rim assembly type comprising a pneumatic tire permanently secured to a metal rim which can be detachably secured to a wheel body.

---

This invention relates to vehicle wheels and is concerned with the provision of a tire and rim assembly comprising a pneumatic tire permanently secured to a metal rim which can be detachably secured to a wheel body.

Conventional single-piece rims for motor vehicle wheels are formed with a central inwardly depressed well portion to permit the mounting and dismounting of beaded pneumatic tires. The well portion limits the amount of space available within the rim in which the brake can be mounted, and in order to increase the size of brake drum or disc which can be accommodated in a wheel of a given rim diameter it is desirable to reduce in size or eliminate the well portion.

According to the invention, a method is provided for mounting a pneumatic tire on a metal rim having a pair of tire bead retaining flanges projecting radially beyond the base of the rim and arranged by the provision of a well or other inwardly depressed portion to permit a pneumatic tire to be mounted thereon, said method comprising mounting a tire on the rim and subsequently deforming the rim to reduce or eliminate the radially inward projection of the inwardly depressed portion of the rim.

One method in accordance with the invention for mounting a pneumatic tire on a metal rim having a pair of tire bead retaining flanges projecting radially outwardly beyond the base of the rim, one flange and the adjacent portion of the rim being depressed radially inwardly to permit the beads of a pneumatic tire to pass over the depressed flange, comprises mounting a pneumatic tire on the rim and expanding the depressed flange and the adjacent region of the rim to provide a bead seat to engage the associated bead of the tire.

According to the invention also, a pneumatic tire and rim assembly comprises a one-piece rim formed without an inwardly depressed well portion and having a pneumatic tire seated thereon.

The invention also provides a partly-shaped rim for incorporation into an assembly as defined above, said partly-shaped rim having in axial cross-section a flat base portion and having one tire bead retaining flange depressed radially inwardly to permit the beads of a pneumatic tire to pass over the depressed flange.

The tire and rim assembly in accordance with the invention may be detachably secured to a pressed steel wheel body by means of inwardly projecting lugs fastened to the rim and arranged to be bolted to the wheel body. Alternatively, the tire and rim assembly may be provided with means engageable by a gripping member provided on a hub element as described in our co-pending U.K. patent application No. 51,690/64.

Two alternative methods in accordance with the invention will now be described, by way of example, with reference to the accompanying drawings, in which.

Figure 1:
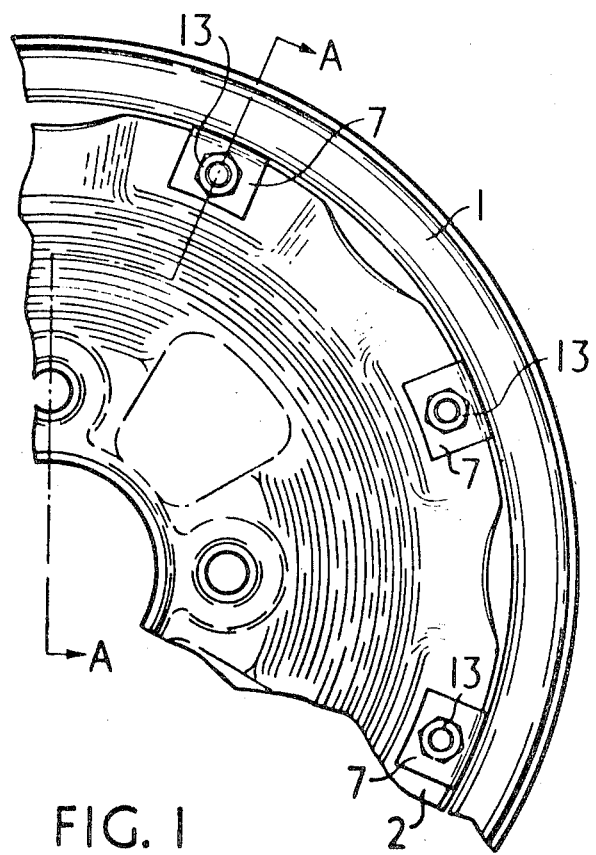
FIG. 1 is an elevation of part of a wheel, viewed in the axial direction.
Figure 2:
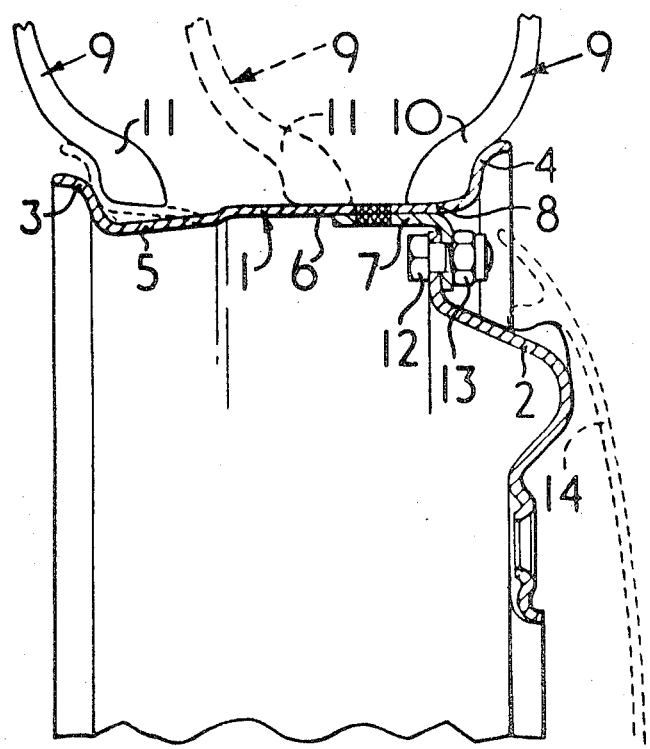
FIG. 2 is a cross-sectional view on the line A—A of FIG. 1, illustrating one method for mounting a pneumatic tire on the rim portion of the wheel.

In a preferred method as illustrated in FIG. 2, flat-base rim 1 for mounting on a wheel body 2 is manufactured from sheet steel strip by a conventional rolling process, and is formed with radially outwardly projecting flanges 3 and 4. The flange 3, and the adjacent bead seating portion 5 of the rim base 6, is formed in the rolling process so that it is depressed radially inwardly in relation to the remainder of the rim.

Eight members of L-shaped cross-section are welded to the rim so as to provide inwardly extending lugs 7 in equally-spaced positions around the circumference of the rim and in a common plane with the centre line of the bead seating portion 8 of the non-depressed part of the rim. The rim is also drilled to enable a tire inflation valve to be fitted in the usual manner.

A tubeless pneumatic tire 9 is then mounted on the rim, the bead 10 of the tire being seated on the bead-seating portion 8 and the bead 11 of the tire being in the position indicated in dotted lines in FIG. 2. The rim is placed on an expanding chuck or on an expanding roller device of conventional form which is operated to expand the depressed portion 5 of the rim radially outwardly to provide a bead seating portion 5 as indicated in dotted lines which subsequently or in the expanding process makes firm engagement with the associated tire bead.

Figure 3:
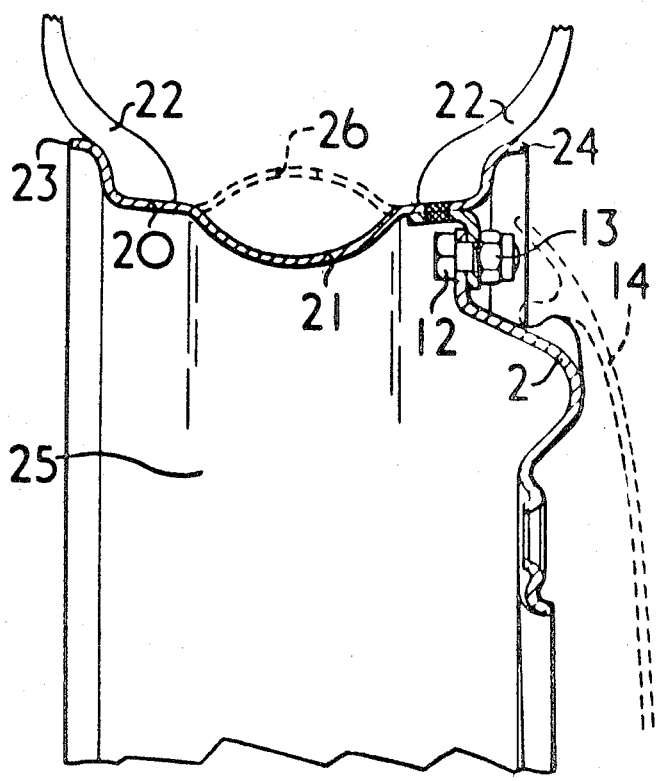
FIG. 3 is similar view to FIG. 2, showing an alternative method.

The wheel body 2 is the same for the two arrangements illustrated in FIGS. 2 and 3, and is secured to the lugs 7 by bolts 12 and nuts 13, the nuts being concealed in the finished assembly by a detachable hub cap 14 shown in dotted lines in FIGS. 2 and 3.

In the alternative method shown in FIG. 3 the rim 20 is formed with a central well portion 21, and the tire 22 is fitted in the normal manner. The tire and rim assembly thus produced is then mounted in a press (not shown) having a pair of disc-shaped plates which are provided with annular rubber sealing rings to engage the sides 23, 24 of the rim flanges and thus to provide a sealed chamber 25 bounded by the inner surface of the rim and the two plates. Pneumatic pressure is then applied to the chamber 25 to cause the well portion of the rim to be expanded radially outwardly until, as shown in dotted lines in FIG. 3, it assumes a concave curvature viewed from the inside of the rim. In this method the valve hole 26 will be drilled after the expanding process, or alternatively may be temporarily sealed during this process.

Both of the methods described above provide a tire and rim assembly in which the usual well portion of the rim is completely eliminated, the tire being permanently secured to the rim.

The main advantage of this construction is that the saving of space within the rim enables a larger diameter brake to be fitted. Further advantages are, in the case of the embodiment described with reference to FIG. 2, that less material is required to form the rim, and the rolling process for manufacture of the rim is simplified since no well portion has to be formed. It is also possible, in the construction in accordance with the invention, to provide the body portion of the wheel with vent holes at a greater distance from the axis of the wheel, thus improving the cooling of the brake.

Although the present invention has been illustrated and described in connection with certain selected example embodiments it will be understood that these are illustrative of the invention and are by no means restrictive thereof. It is reasonably to be expected that those skilled in this art can make numerous revisions and adaptations of the invention and it is intended that such revisions and adaptations will be included within the scope of the following claims as equivalent of the invention.

Having now described our invention, what we claim is:

1. An improved method for mounting a pneumatic tire on a metallic deformable rim having a radially inwardly depressed portion, said depressed portion being proportioned to be of a diameter less than the diameter of the beads of a pneumatic tire, passing the tire onto the rim and over the depressed portion thereof and into mounting position wherein one of the tire beads engages a retaining flange at one side of the rim, and thereafter expanding the inwardly depressed rim portion radially outwardly to bring a tire bead retaining flange thereof into engagement with the bead at the opposite side of the rim for effecting mounting of said pneumatic tire.

2. A method according to claim 1 for mounting a pneumatic tire including the step of radially outwardly expanding the depressed rim portion and the adjacent region of the rim to form the bead seat concurrently with outer expansion movement of said depressed portion.

3. In a method according to claim 1 the step of expanding the well portion of the metal rim radially outwardly relative to the rim.

4. A method according to claim 3 wherein the well portion of the rim is expanded by fluid under pressure to cause the well portion of the rim to be expanded radially outwardly.

5. A method according to claim 4 wherein the well portion is expanded radially outwardly until it assumes a concave curvature viewed from the inside of the rim.

References Cited

UNITED STATES PATENTS

| | | | |
|---|---|---|---|
| 2,261,465 | 11/1941 | Grange et al. | 29—159.01 |
| 2,596,771 | 5/1952 | Harbour | 29—512X |
| 2,840,422 | 6/1958 | Main et al. | |
| 3,008,770 | 11/1961 | Mueller | 29—512X |
| 3,252,208 | 5/1966 | Reuter et al. | 29—159.01 |

CHARLIE T. MOON, Primary Examiner

U.S. Cl. X.R.

29—450, 453, 512; 152—330